United States Patent Office 3,170,952
Patented Feb. 23, 1965

---

3,170,952
SIMULTANEOUS PRODUCTION OF ADIPIC ACID AND CYCLOHEXANONE OXIME
Jesse Oris White, Orange, Tex., assignor to E. I. du Pont de Nemours and Company, Wilmington, Del., a corporation of Delaware
No Drawing. Filed Apr. 1, 1960, Ser. No. 19,179
1 Claim. (Cl. 260—531)

This invention is concerned with a process for the simultaneous production of adipic acid and cyclohexanone oxime, and, more particularly, with a process comprising the conversion of the mixture of cyclohexanol and cyclohexanone, obtained from liquid phase air oxidation of cyclohexane into adipic acid and cyclohexanone oxime by a low temperature, nitric acid oxidation process.

The conversion of cyclohexane into adipic acid by processes comprising liquid phase, air-oxidation of cyclohexane to a mixture comprising cyclohexanol and cyclohexanone followed by nitric acid oxidation of this mixture to give adipic acid is disclosed in United States Patents 2,439,513, issued April 13, 1948, and 2,557,282, issued June 19, 1951, to C. H. Hamblet and Ambrose McAlevy. Such processes have provided a commercially-valuable route to adipic acid, an ingredient for the production of nylons (linear polycarboxylamides) by condensation polymerization with aliphatic diamines. The polymerization of adipic acid with hexamethylenediamine yields polyhexamethyleneadipamide, a widely-used nylon in both textile and plastic applications, which is manufactured on a scale of many millions of pounds per year. Therefore, routes to adipic acid which will be more economical and which will provide nylons at lower cost to meet ever-increasing competition are valuable process objectives. As carried out in processes such as those of Hamblet et al., the nitric acid oxidation step results in the reduction of vast quantities of $HNO_3$ to $N_2O$ and $N_2$ which must be destroyed as waste gases. This loss of nitrogen adds greatly to the cost of manufacture of the adipic acid.

Cyclohexanone oxime is a valuable intermediate for conversion, by a Beckmann rearrangement, to ε-caprolactam, the monomer employed for polymerization to polycaprolactam. This nylon likewise is manufactured on a large scale for fabrication to textiles and plastic articles. At the present time, cyclohexanone oxime is manufactured by the reaction of cyclohexanone with hydroxylamine prepared either by the reaction of sodium nitrite with sodium bisulfite and $SO_2$ or by the rearrangement and hydrolysis of a nitroalkane. Both of these processes are expensive and result in a high cost for hydroxylamine and hence for cyclohexanone oxime and ε-caprolactam. A process which will permit the conversion of the $HNO_3$ now lost as $N_2$ and $N_2O$ in the nitric acid oxidation route to adipic acid into cyclohexanone oxime will provide this valuable intermediate at a substantially lower manufacturing cost while at the same time reducing the cost of manufacture of adipic acid.

Therefore, it is an object of this invention to provide a process for the nitric acid oxidation of a mixture consisting essentially of cyclohexanol and cyclohexanone to yield adipic acid and cyclohexanone oxime. It is another object of this invention to provide a process for the nitric acid oxidation of a mixture consisting essentially of cyclohexanol and cyclohexanone in which little or no $N_2O$ and $N_2$ are formed as byproducts. It is a further object to conduct the oxidation of a mixture of cyclohexanol and cyclohexanone with nitric acid in such a way that the only nitric acid consumed in the oxidation is reduced to the oxime state. Other objects and advantages of this invention will appear hereinafter.

It has now been discovered that the objects and advantages of this invention can be achieved by providing a process for the production of adipic acid and cyclohexanone oxime which comprises: (1) reacting adipomononitrolic acid with cyclohexanol by heating these reactants togther under reduced pressure and distilling off overhead cyclohexylnitrite together with some unreacted cyclohexanol; (2) heating the residual adipomonohydroxamic acid solution with cyclohexanone and a dilute aqueous mineral acid; (3) subsequently adjusting the pH of the resulting solution to the range of 7 to 8 with an aqueous base selected from the group consisting of alkali metal hydroxides, alkaline earth hydroxides, and ammonium hydroxide; (4) extracting the cyclohexanone oxime with a solvent immiscible with the aqueous phase and recovering the oxime by distillation of the solvent; (5) concentrating the aqueous phase by evaporation, and cooling to crystallize adipic acid; (6) oxidizing the cyclohexylnitrite to adipomononitrolic acid by means of aqueous nitric acid at a temperature between 20° and 35° C.; (7) recycling the adipomononitrolic acid to the first step; and (8) oxidizing with air the mixture of NO and $NO_2$ (obtained from the nitrous acid formed, to nitric acid for recycle. Additional adipomononitrolic acid can be prepared by the oxidation, with aqueous nitric acid of at least one member of the group consisting of cyclohexanol and cyclohexanone.

The reactions involved in the process of this invention can be described by the following chemical equations:

(1)

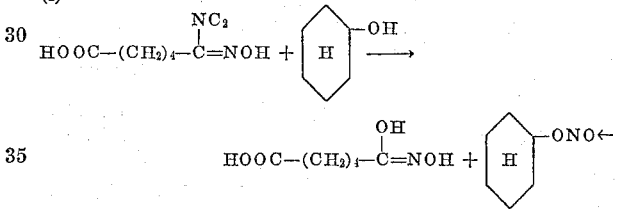

(2)

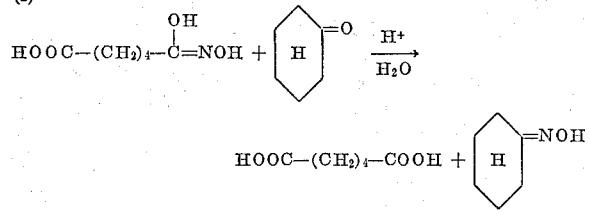

(3)

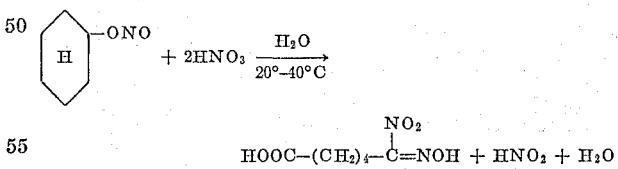

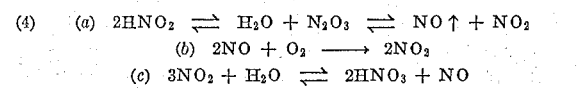

(4) (a) $2HNO_2 \rightleftharpoons H_2O + N_2O_3 \rightleftharpoons NO\uparrow + NO_2$
(b) $2NO + O_2 \longrightarrow 2NO_2$
(c) $3NO_2 + H_2O \rightleftharpoons 2HNO_3 + NO$ Equation 1 shows the reaction of adipomononitrolic acid with cyclohexanol to yield adipomonohydroxamic acid plus cyclohexyl nitrite. Equation 2 shows the reaction of adipomonohydroxamic acid with cyclohexanone to yield adipic acid plus cyclohexanone oxime. This reaction is driven to completion by refluxing with a dilute mineral acid such as aqueous HCl, $H_2SO_4$, $HNO_3$, $H_3PO_4$, etc. If desired, of course, other ketones can be substituted for cyclohexanone and the corresponding oximes obtained. The oxime can, if desired, be hydrolyzed to regenerate the ketone for recycle and thus provide a novel route to hydroxylamine, as disclosed in a copending application.

While the reactions indicated by equations 1 and 2 can be carried out in separate process steps, generally it is preferable and more convenient to carry them out together by dissolving adipomononitrolic acid in the mixture of cyclohexanol and cyclohexanone obtained from the air oxidation of cyclohexane in the liquid phase. The proportions of cyclohexanol to cyclohexanone in this mixture can vary from 30% to 70% cyclohexanol with a complementary proportion of cyclohexanone; mixtures of these proportions are operable in the process of this invention. In this case, some of the excess of either cyclohexanol or cyclohexanone will be distilled overhead with the cyclohexylnitrite. This reduced pressure distillation of cyclohexylnitrite can be carried out at temperatures between 50° and 100° C. at pressures between 45 and 250 mm. of Hg.

The oxidation of cyclohexylnitrite with aqueous nitric acid at 20°–40° C. is shown by equation 3. Similar equations apply to the oxidation of cyclohexanol and cyclohexanone. Aqueous nitric acid from about 25% to about 75% by weight $HNO_3$ can be employed for this oxidation. An excess of $HNO_3$ is employed. The proportions of nitric acid to cyclohexylnitrite (or cyclohexanol or cyclohexanone or mixtures thereof) can be varied from about 2 to 50 moles of $HNO_3$ per mole of the cyclohexyl compound. The formation of adipomononitrolic acid by the oxidation of cyclohexanol alone under somewhat similar conditions is disclosed in U.S. Patent 2,881,215 issued on April 17, 1959, to Henry C. Godt, Jr. It now has been found that cyclohexanone also gives adipomononitrolic acid under similar conditions, but a very important new finding is the discovery that a high yield of adipomononitrolic acid from cyclohexanone is obtained only with the addition to the $HNO_3$ of at least equimolar quantities of $NO_2$, based on the cyclohexanone. The source of this $NO_2$ can be gaseous $NO_2$, NO, aqueous $HNO_2$, or cyclohexylnitrite. Therefore, any cyclohexanol or cyclohexanone distilling over with the cyclohexylnitrite is likewise converted by this oxidation step to adipomononitrolic acid.

The nitrous acid formed as a byproduct of the oxidation of cyclohexylnitrite can be recovered for recycle by oxidation to nitric acid with air, as indicated by the reactions shown in Equations 4a, 4b, and 4c.

The separation of cyclohexanone oxime from adipic acid is achieved by neutralizing the reaction mixture to a pH in the range of 7 to 8. The neutralization is accomplished by the addition of an aqueous base selected from the group consisting of alkali metal hydroxides, alkaline earth hydroxides, and ammonium hydroxide. The oxime is extracted from the neutralized reaction mixture with a solvent which is substantially immiscible with the aqueous phase. Solvents suitable for this include ethyl ether, cyclohexanone-cyclohexanol mixed solvent, cyclohexanone, ethyl acetate, and cyclohexane. Where the reactions indicated by Equations 1 and 2 are carried out together, a suitable solvent for this extraction is an additional quantity of the mixture of cyclohexanol and cyclohexanone. The oxime is recovered by distillation of the solvent, usually under reduced pressure.

After extraction of the cyclohexanone oxime, the aqueous phase is concentrated by evaporative distillation, cooled, and the crystallized adipic acid is recovered by filtration or centrifugation.

The process of this invention is further illustrated by the following examples of preferred procedures for carrying out the process. The examples are illustrative but are not intended to limit the process as disclosed above. Variations would be obvious to those skilled in the art. In these examples, parts are by weight.

Example 1

Two-hundred eighty two parts of aqueous 67% nitric acid containing a trace of $NO_2$ were placed in a flask equipped with a dropping funnel, a stirrer, and a cooling jacket. Fifty parts of cyclohexanol were added slowly to the stirred nitric acid through the dropping funnel at such a rate that the temperature of the reaction mixture remained at 20° C. After all of the cyclohexanol had been added, the reaction mixture was cooled to 0° C., diluted with 150 parts of ice-water, and 62 parts of adipomononitrolic acid was found by ultraviolet analysis. The adipomononitrolic acid was recovered by filtration and washed with cold water. It had a melting point of 77–78° C.

Then 0.727 part of the dry adipomononitrolic acid was dissolved in 19 parts of cyclohexanol in a distillation flask and the solution was heated at 80° C. under 50 mm. pressure while cyclohexylnitrite distilled from the reaction mixture together with some of the excess cyclohexanol. Distillation was continued until all of the cyclohexylnitrite had distilled from the reaction mixture (as indicated by infrared analysis).

The residue in the distillation flask was then diluted with 10 parts of 5% HCl and heated under reflux for 30 minutes. Then 9.5 parts of cyclohexanone were added and the mixture heated 15 minutes at reflux. The reaction mixture was cooled and neutralized with aqueous NaOH until the pH was in the range of 7–8. This solution was extracted with ethyl ether to remove cyclohexanone oxime; evaporation of the ether yielded 0.3 part of cyclohexanone oxime. The aqueous phase was concentrated by evaporative distillation, cooled, and 0.55 part of adipic acid was recovered by filtration.

Example 2

0.727 part of adipomononitrolic acid was dissolved in 19 parts of a mixture consisting of equal parts by weight of cyclohexanol and cyclohexanone contained in a distillation flask and the solution heated under 50 mm. pressure at 80° C. until all the cyclohexylnitrite had distilled. Then dilute aqueous nitric acid was added to reduce the pH value to 1–2. This mixture was refluxed for 30 minutes and then neutralized to a pH of 7–8 with aqueous NaOH. The cyclohexanone oxime was recovered by extraction with 10 additional parts of the mixture of cyclohexanol and cyclohexanone followed by distillation of the cyclohexanol and cyclohexanone, leaving as residue 0.15 part of cyclohexanone oxime.

Adipic acid, 0.55 part, was recovered by concentration of the aqueous phase as in Example 1.

Example 3

Twenty parts of 67% nitric acid were placed in a flask equipped with a dropping funnel, stirrer, and a cooling jacket. Eighty-six hundredths part of cyclohexyl nitrite was added slowly to the stirred nitric acid through the dropping funnel at such a rate that the temperature of the reaction mixture remained at 20° C. After all of the cyclohexyl nitrite had been added, a sample was removed for analysis and the reaction mixture cooled to 0° and diluted with 10 parts of water. Adipomononitrolic acid precipitated and was recovered by filtration and washing with cold water. The analysis by ultraviolet absorption methods showed that 0.82 part of adipomononitrolic acid had been synthesized.

Example 4

Twenty parts of 67% nitric acid were placed in a flask equipped with a dropping funnel, stirrer, and a cooling jacket. Ninety-eight hundredths part of a mixture composed of 33.8% cyclohexanone, 33.2% cyclohexyl nitrite, and 33.0% cyclohexanol was added slowly to the stirred nitric acid through the dropping funnel at such a rate that the temperature of the reaction mixture remained at 20° C. After all of the mixture had been added, a sample was removed for analysis and the reaction mixture cooled to 0° and diluted with 10 parts of water. Adipomononitrolic acid precipitated and was recovered by filtration and washing with cold water. The analysis by ultraviolet absorption methods showed that 0.96 part of adipomononitrolic acid had been synthesized.

Example 5

Twenty parts of 67% nitric acid were placed in a flask equipped with a dropping funnel, stirrer, and a cooling jacket. A stream of $NO_2$ gas was sparged through the nitric acid continuously. One and two-hundredths part of cyclohexanone was added slowly to the stirred nitric acid through the dropping funnel at such a rate that the temperature of the reaction mixture remained held at 20° C. After all of the cyclohexanone had been added, a sample was removed for analysis and the reaction mixture cooled to 0° and diluted with 10 parts of water. Adipomononitrolic acid precipitated and was recovered by filtration and washing with cold water. The analysis by ultraviolet absorption methods showed that 1.07 part of adipomononitrolic acid had been synthesized.

Example 6

One part of adipomononitrolic acid was dissolved in 10 parts of cyclohexanol in a distillation flask and the solution was heated at 80° C. under 50 mm. pressure while distilling 0.65 part of cyclohexyl nitrite from the reaction mixture along with some excess cyclohexanol. The residue in the distillation flask was then diluted with 14 parts of 5% HCl and heated under reflux for 30 minutes. Then 5 parts of cyclohexanone were added and the mixture heated 15 minutes at reflux. The reaction mixture was cooled and neutralized with sodium hydroxide until the pH was in the range of 7–8. This solution was extracted with ethyl ether to remove cyclohexanone oxime; evaporation of the ether yielded 0.41 part of cyclohexanone oxime. The aqueous phase was concentrated by evaporative distillation, cooled, and 0.76 part of adipic acid was recovered by filtration.

The 0.65 part of cyclohexyl nitrite obtained above was mixed with 0.65 part of cyclohexanone and 0.65 part of cyclohexanol and the mixture added dropwise to 40 parts of 67% nitric acid contained in a flask equipped with a dropping funnel, a stirrer, a cooling jacket, and an off-gas vent line. As the reaction proceeded, a mixture of NO and $NO_2$ gas was evolved and collected. This mixture of gases was combined with air to convert the NO to $NO_2$ and the $NO_2$ absorbed in water which converted it into nitric acid. The nitric acid was recycled to the oxidation step. The temperature of the reaction mixture during the oxidation was held at 20° C. After all the mixture of cyclohexyl nitrite, cyclohexanone, and cyclohexanol had been added, the reaction mixture was sampled, cooled to 0°, and diluted with 20 parts of water to precipitate the adipomononitrolic acid. The adipomononitrolic acid was recovered by filtration and washed with cold water. Analysis of the sample showed a yield of 1.92 parts of adipomononitrolic acid. The adipomononitrolic acid was recycled to the first step of the process.

I claim:

In a process for the oxidation of cyclohexanol and cyclohexanone, admixed with cyclohexyl nitrite in at least equimolar amount to the cyclohexanone, to produce adipic acid without substantial loss of $HNO_3$ to $N_2O$ and $N_2$, and in which the oxidation is carried out at a temperature between 20° C. and 35° C. with an excess of aqueous nitric acid having a concentration of $HNO_3$ in the range of 25% to 75% by weight to yield adipomononitrolic acid, and in which the adipomononitrolic acid is converted to adipomonohydroxamic acid by heating at 50°–100° C. under reduced pressure with an excess of cyclohexanol while distilling off the resultant cyclohexylnitrite and recycling said distillate to the oxidation step, and in which the resulting adipomonohydroxamic acid is hydrolyzed to yield adipic acid by heating under reflux with a dilute aqueous mineral acid, the improvement which comprises: simultaneously producing adipic acid and cyclohexanone oxime and separating these products by (1) employing a mixture of cyclohexanone and cyclohexanol consisting of from 30% to 70% by weight cyclohexanone for converting the adipomononitrolic acid to adipomonohydroxamic acid; (2) hydrolyzing the resultant adipomonohydroxamic acid to adipic acid in the presence of an excess of the mixture of cyclohexanone and cyclohexanol; (3) adjusting the pH of the resulting aqueous mixture of adipic acid, cyclohexanone oxime, cyclohexanone, and cyclohexanol to the range of 7–8 with an aqueous base selected from the group consisting of alkali metal hydroxides, alkaline earth metal hydroxides, and ammonium hydroxide; and (4) separating the aqueous phase comprising a solution of adipic acid from the organic phase comprising a solution of cyclohexanone oxime in the mixed solvent consisting of cyclohexanone and cyclohexanol.

References Cited in the file of this patent
UNITED STATES PATENTS

| | | |
|---|---|---|
| 2,719,172 | Nebe et al. | Sept. 27, 1955 |
| 2,789,136 | O'Hara | Apr. 16, 1957 |
| 3,076,026 | White | Jan. 29, 1963 |

OTHER REFERENCES

Sidgwick: "Organic Chemistry of Nitrogen," rewritten by Taylor et al., pages 169 and 197 to 198 (1937).

Godt et al.: "Journal of the American Chemical Society," volume 78, pages 1461–63 (1956).

Fieser et al.: "Organic Chemistry," page 131 (1950).